(12) United States Patent
Zhang

(10) Patent No.: US 11,958,620 B2
(45) Date of Patent: Apr. 16, 2024

(54) HYDROGEN ELECTRIC HYBRID POWER PLANT FOR HOVERCAR AND CONTROL METHOD

(71) Applicant: HANGZHOU CITY UNIVERSITY, Hangzhou (CN)

(72) Inventor: Xinfeng Zhang, Hangzhou (CN)

(73) Assignee: HANGZHOU CITY UNIVERSITY, Hangzhou (CN)

( * ) Notice: Subject to any disclaimer, the term of this patent is extended or adjusted under 35 U.S.C. 154(b) by 0 days.

(21) Appl. No.: 18/197,755

(22) Filed: May 16, 2023

(65) Prior Publication Data

US 2024/0010347 A1 Jan. 11, 2024

(30) Foreign Application Priority Data

Jul. 7, 2022 (CN) .......................... 202210855459.4

(51) Int. Cl.
| | |
|---|---|
| *B64D 27/24* | (2006.01) |
| *B60F 5/02* | (2006.01) |
| *F02K 3/00* | (2006.01) |
| *F04D 25/06* | (2006.01) |
| *B64D 27/02* | (2006.01) |

(52) U.S. Cl.
CPC ................ *B64D 27/24* (2013.01); *B60F 5/02* (2013.01); *F02K 3/00* (2013.01); *F04D 25/06* (2013.01); *B64D 2027/026* (2013.01); *F05D 2220/36* (2013.01)

(58) Field of Classification Search
CPC ..... B60F 5/02; F02K 5/00; F02K 3/00; F02K 3/04; F02K 3/06; F02K 3/062; F02K 3/065; B64D 2027/026; B64D 27/24; B64D 2041/005; F05D 2220/36; F05D 2220/76; Y02T 90/40; Y02T 50/60; F01D 15/10; Y02E 60/50; F04D 25/06; H01M 2250/20

See application file for complete search history.

(56) References Cited

U.S. PATENT DOCUMENTS

| | | | |
|---|---|---|---|
| 7,479,339 B2* | 1/2009 | Okazaki ............ | H01M 8/04014 429/415 |
| 2011/0200901 A1* | 8/2011 | Reiser ............... | H01M 8/04559 429/429 |

* cited by examiner

*Primary Examiner* — Loren C Edwards
(74) *Attorney, Agent, or Firm* — FALATI

(57) ABSTRACT

The present disclosure relates to a hydrogen electric hybrid power plant for a hovercar. The hydrogen electric hybrid power plant comprises a first-stage duct, a transition duct and a second-stage duct. An air outlet end of the first-stage duct is connected to the second-stage duct through the transition duct. A hydrogen reactor is arranged in the first-stage duct, and the hydrogen reactor is fixed with the first-stage duct through a plurality of supporting pieces A. A primary filter screen is arranged at a front end of the first-stage duct and fixed on the first-stage duct through a hoop, so that low-altitude sundries and dust are prevented from entering the reactor. A return pipe is arranged, and the problems of oxygen supply, heat dissipation and cooling and the like of the hydrogen reactor are solved through ducted airflow. A motor power supply requirement of a ducted fan is met.

20 Claims, 5 Drawing Sheets

US 11,958,620 B2

HYDROGEN ELECTRIC HYBRID POWER PLANT FOR HOVERCAR AND CONTROL METHOD

CROSS-REFERENCE TO RELATED APPLICATION

This patent application claims the benefit and priority of Chinese Patent Application No. 202210855459.4, filed with the China National Intellectual Property Administration on Jul. 7, 2022, the disclosure of which is incorporated by reference herein in its entirety as part of the present application.

TECHNICAL FIELD

The present disclosure belongs to the technical field of electric hovercar power driving, and particularly relates to a hydrogen electric hybrid power plant for a hovercar and a control method.

BACKGROUND

The hovercar can fly in air or travel on land, and can be transformed into an airplane from a road car. The hovercar is the first choice to solve traffic congestion and three-dimensional traffic in the future. Up to 2020, there are more than 160 hovercar factories in the world, which are mainly concentrated in America and Europe. At present, most of the hovercar products are in the flight test stage, and a few of hovercars are scheduled and delivered. It is predicted that by 2030, the hovercar industry will create a market size of 300 billion US dollars, and some market shares of ground transportation, aircraft and public transportation will be transformed firstly. In 2020, in the No. 18 order of the Ministry of Transport of the People's Republic of China, called "Regulations on Administration of General Aviation Business License", general aviation business is divided into three categories, including a passenger-carrying category, a human-carrying category and other categories.

The electrically driven vertical take-off and landing hovercar refers to a hovercar which uses a motor to drive a propeller in a vertical take-off and landing aircraft so that the hovercar suspends and moves forward. Compared with a small fixed-wing aircraft, the hovercar has the advantages of flexible take-off and landing, no need for a take-off runway, and air-road coordination with ground transportation. The hovercar is the hottest hovercar in the current hovercar track. Representative manufacturers of the electrically driven vertical take-off and landing hovercar are German companies Volocopter and Lilium as well as the American company of Joby Airlines. The electrically driven vertical take-off and landing hovercar is also often called "passenger-carrying drone" and can also be used to transport goods.

However, energy used by the electrically driven hovercar mainly depends on airborne lithium batteries, at present. The flight distance is very short, because of the limited carrying energy. At the same time, the structure of a vertical take-off and landing spin wing is particularly insufficient in generating forward thrust, so thrust required for forward flight cannot be satisfied. For example, up to April, 2022, the hovercars developed by Chinese companies such as Xiaopeng Huitian and Shenzhen Yihang have a flight duration of only about 20 minutes and a flight distance of only tens of kilometers, and the commercial practical value of manned transportation cannot be achieved at present.

Among the existing published patents and scientific literatures, technologies related to the hovercar power drive device are listed as follows.

A dual-duct hybrid power plant, a hovercar and a control method (CN202111650292.X) are disclosed by Yuan Yiqing of Beijing National New Energy Vehicle Technology Innovation Center Co., Ltd. The dual-duct hybrid power plant includes an outer duct, an inner duct and a compression propulsion system using compressed air as a working medium. The dual-duct hybrid power plant is mainly used for subsonic or supersonic propulsion hovercars.

A general power device for automobiles and four-axis aircrafts (CN202010807552.9) is disclosed by Chen Feng. The characteristics lie in that in a car body with four corners connected with power components through shafts of a fixed support, the upper side of a front end of the fixed support is connected with a propeller through propeller shafts, and the outer side of the front end of the fixed support is connected with wheels through wheel shafts.

A gas-electric hybrid power system for a hovercar (CN201910285489.4) is disclosed by Zong Jian of Jiangsu Aviation Vocational and Technical College. The characteristics lie in that the system includes a hovercar shell, an oil-driven drive module, an electric drive module, a power duct, a power wheel and an unpowered wheel.

A power system and a hovercar (CN201310478698.3) are disclosed by Shenzhen Guangqi Hezhong Technology Co., Ltd. The characteristics lie in that the power system includes ducted power units. Each ducted power unit includes a first ducted fan and a second ducted fan, wherein the first ducted fan and the second ducted fan are respectively in transmission connection with an engine through a first synchronous belt and a second synchronous belt, so that the first ducted fan and the second ducted fan rotate synchronously.

An oil-electric hybrid power system and a vertical take-off and landing hovercar of the oil-electric hybrid power system (CN201710934811.2) are disclosed by Liu Weidong of National University of Defense Technology of Chinese People's Liberation Army. The characteristics lie in that the oil-electric hybrid power system includes an air inlet and an air pressurization system arranged on the windward side. The pressurization system includes an air compressor, a fuel inlet, a plurality of gas outlets, a plurality of turbofan thrusters and the like.

A power transmission system of a plug-in hybrid hovercar with vertical take-off and landing (CN201711135410.7) is disclosed by Du Bo of Sichuan Institute of Special Equipment Inspection. A power conversion system of a hovercar is disclosed by Lin Haiying of Beihang University. The power conversion system includes a master cylinder, a liquid storage container, a direct motor, a pressure sensor and the like. The two systems are mainly used in the field of power transmission.

SUMMARY

The present disclosure aims to overcome defects in the prior art, and provides a hydrogen electric hybrid power plant for a hovercar and a control method.

The hydrogen electric hybrid power plant for a hovercar includes a first-stage duct, a transition duct and a second-stage duct. An air outlet end of the first-stage duct is connected to the second-stage duct through the transition duct. A hydrogen reactor is arranged in the first-stage duct, and the hydrogen reactor is fixed with the first-stage duct through a plurality of supporting pieces A. A primary filter screen is arranged at a front end of the first-stage duct and fixed on the first-stage duct through a hoop, so that low-altitude sundries and dust are prevented from entering the reactor. A filter is also installed in the first-stage duct and in front of the hydrogen reactor. The filter has the functions of physical filtration and chemical filtration at the same time, and is used for filtering dust, particulate matters and chemical harmful gases in low air. The hydrogen reactor is provided with an anode hydrogen inlet pressure regulator, and the anode hydrogen inlet pressure regulator is electrically connected with an external hydrogen pressure regulating system. One end of a return pipe is arranged at an outlet end of the first-stage duct, and the other end of the return pipe is connected into a rear end of the filter and an inlet of the hydrogen reactor. Some warm and humid airflow and liquid water are returned to the inlet of the hydrogen reactor through the return pipe. The returned warm and humid air low and liquid water can effectively heat and humidify internal materials of the hydrogen reactor, so that the performance and service life of the hydrogen reactor can be effectively improved, and the service life of the hydrogen reactor can be effectively prolonged. A motor is electrically connected with a turbofan, and the turbofan is installed in the transition duct or the second-stage duct.

Preferably, a component of the motor is fixed together with an outer wall of the transition duct or the second-stage duct through a supporting piece B. The motor is a drive motor or a turbofan motor.

Preferably, the hydrogen reactor adopts a metal bipolar plate and a proton exchange membrane electrode, and the metal bipolar plate and the proton exchange membrane electrode are combined into the hydrogen reactor in a laminated manner; and the size of the hydrogen reactor is determined by external power.

Preferably, a cathode of the hydrogen reactor is connected to one end of an anode wire, and the other end of the anode wire is connected to a power input anode of a power plant controller. An anode of the hydrogen reactor is connected to one end of a cathode wire, and the other end of the cathode wire is connected to a cathode of the power plant controller. Three-phase space vector control wires are electrically connected with the power plant controller. The anode hydrogen inlet pressure regulator is also electrically connected with a control wire of the power plant controller, and is used for adjusting amplitude of anode pressure.

Preferably, the hydrogen reactor is cuboid as a whole, which is mainly determined by an internal structure of the hydrogen reactor. An inner diameter of the first-stage duct is larger than an outer profile of the hydrogen reactor, and an effective gap must be reserved, so that airflow can pass through the hydrogen reactor and the gap at the same time.

Preferably, the transition duct is used for adjusting an airflow velocity ratio in the first-stage duct and the second-stage duct, adjusting reactor feed pressure of the hydrogen reactor and rotational speed of the motor, and shaping outlet airflow of the first-stage duct.

A control method of the hydrogen electric hybrid power plant for a hovercar includes the following steps:

step one, giving certain auxiliary starting current by an external power supply, starting the turbofan, and further starting the drive motor, wherein the drive motor reaches a lowest rotational speed to enter a standby state;

step two, in the operational process of the hybrid power plant, determining the output voltage of the hydrogen reactor by the inlet pressure of anode hydrogen, thus determining the output electric power of the hydrogen reactor, turning on the anode hydrogen inlet pressure regulator, according to external power, controlling the anode hydrogen inlet pressure regulator through the control wire of the power plant controller according to a proportional relationship set between hydrogen pressure and rotational speed of the motor by the power plant controller, and adjusting anode hydrogen inlet pressure of the hydrogen reactor in real time; because the output voltage of the hydrogen reactor is related to the pressure of hydrogen, the output of electric power is related to the pressure of hydrogen; in this state, the hybrid power plant can produce electric power and gas propulsive gas at any time;

step three, controlling the rotational speed of the motor, outputting electric energy outward by the hydrogen reactor, and outputting thrust by the turbofan; and step four, turning off the hybrid power plant, namely firstly turning off the anode hydrogen inlet pressure regulator, and then turning off the motor to reach a completely rest state.

Preferably, in the step three, the motor is a drive motor or a turbofan motor; the rotational speed of the motor is calculated by the power plant controller according to the thrust to be output by the turbofan; the three-phase space vector control wires control the rotational speed of the motor according to the calculated thrust to be output by the turbofan.

Preferably, when the power plant controller calculates the rotational speed of the motor according to the thrust to be output by the turbofan, a set of data corresponding to the rotational speed and the thrust is firstly calibrated through an experiment, and then inverse search is carried out by linear fitting with a look-up table method.

Preferably, in the step two, and a set ratio between the hydrogen pressure and the rotational speed of the motor is (10:9) to (10:8). The hydrogen pressure and the rotational speed of the motor are kept increased or decreased in the same ratio during the change of a power requirement.

The present disclosure has the following beneficial effects.

Disclosed is a hydrogen electric hybrid power plant for a hovercar. The hydrogen electric hybrid power plant is long in endurance and high in acceleration. A design structure that a hydrogen fuel cell reactor and a ducted fan are combined is adopted, including two cascade ducts. The device is also provided with a return pipe, and the problems of oxygen supply, heat dissipation and cooling of the hydrogen reactor are solved by using ducted airflow. The transition duct is arranged for adjusting an airflow velocity ratio in the first-stage duct and the second-stage duct, and the outlet airflow of the first-stage duct is shaped. The device overcomes the defect that an airborne battery and a power plant of the hovercar are large in weight, short in flight time and small in thrust.

The hydrogen reactor is arranged in the first-stage duct. The hydrogen reactor utilizes ducted airflow to supply a cathode oxidant and cool the whole reactor, utilizes the return pipe to collect condensed water at the tail to humidify the reactor, and utilizes an external nozzle to regulate pressure in the hydrogen reactor. The hydrogen reactor is used for power generation. The electric energy produced by the hydrogen reactor supplies power for the motor in the second-stage duct. Redundant electric energy is used for supplying power for the fan motor in the second-stage duct, so that a motor power supply requirement of the ducted fan is solved.

A primary filter screen and a filter are arranged at an inlet of the first-stage duct as protective devices, so that low-altitude sundries and dust are prevented from entering the reactor. In order to make the performance of the hydrogen reactor better, one end of the return pipe is placed at an outlet edge of the first-stage duct, and the other end of the return pipe is connected with the filter and the inlet of the hydrogen reactor, so that some humid and hot airflow flows back to the hydrogen reactor.

The transition duct or the second-stage duct is internally provided with the electrically driven turbofan The turbofan in the second-stage duct provides forward thrust required by the hovercar, the airflow provides fuel and cooling for the hydrogen reactor, and both electric power and thrust can be output, so that the problems of electric power source and forward propulsion are solved, and the weight of a propulsive device and the weight of a power supply are reduced. Especially for the hovercar with vertical take-off and landing, the weight of the hovercar can be reduced, so that the effective load of the hovercar can be improved, and the flight distance of the hovercar can be increased.

Reference signs: 101, primary filter screen; 102, first-stage duct; 103, filter; 104, supporting piece A; 105, hydrogen reactor; 106, transition duct; 107, turbofan; 108, supporting piece B; 109, motor; 110, second-stage duct; 111, anode hydrogen inlet pressure regulator; 112, return pipe; 201, anode wire; 202, cathode wire; 203, power plant controller; 204, three-phase space vector control wire; 206, control wire of power plant controller; 209, drive motor; and 308, turbofan motor.

DETAILED DESCRIPTION OF THE EMBODIMENTS

The description of the present disclosure is further described in conjunction with the following embodiments. The above description of the embodiments is only intended to assist in understanding the present disclosure. It should be noted that those skilled in the art may make several modifications without departing from the principle of the present disclosure and the improvements or modifications shall fall within the protection scope of claims in the present disclosure.

Embodiment I

Figure 1:
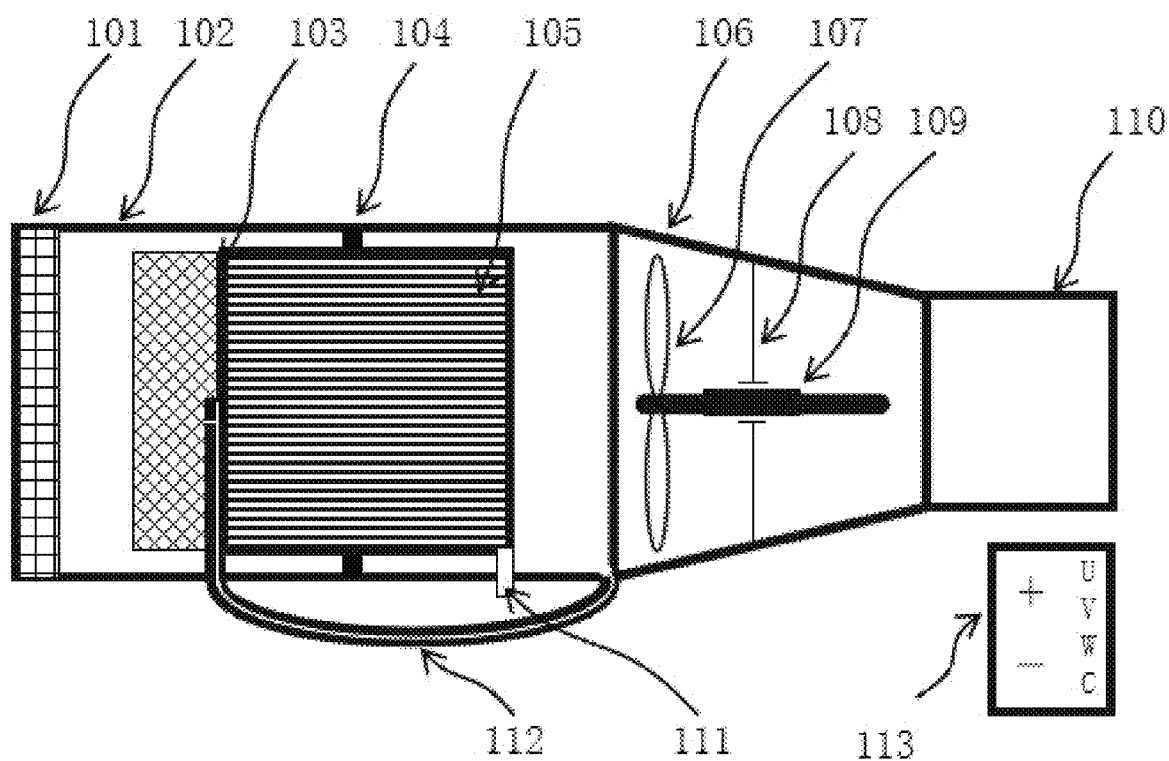
FIG. 1 is a structural schematic diagram of a hydrogen electric hybrid power plant.
Figure 2:
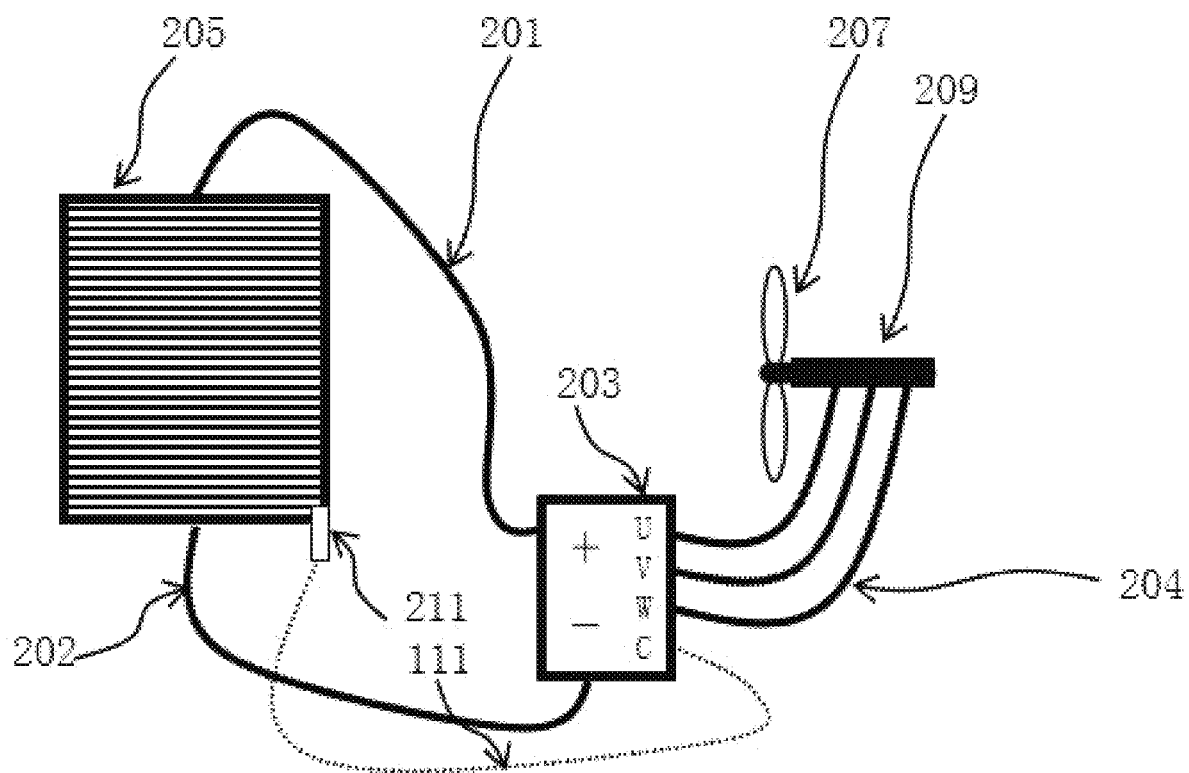
FIG. 2 is a schematic circuit diagram of a hydrogen electric hybrid power plant.
Figure 3:
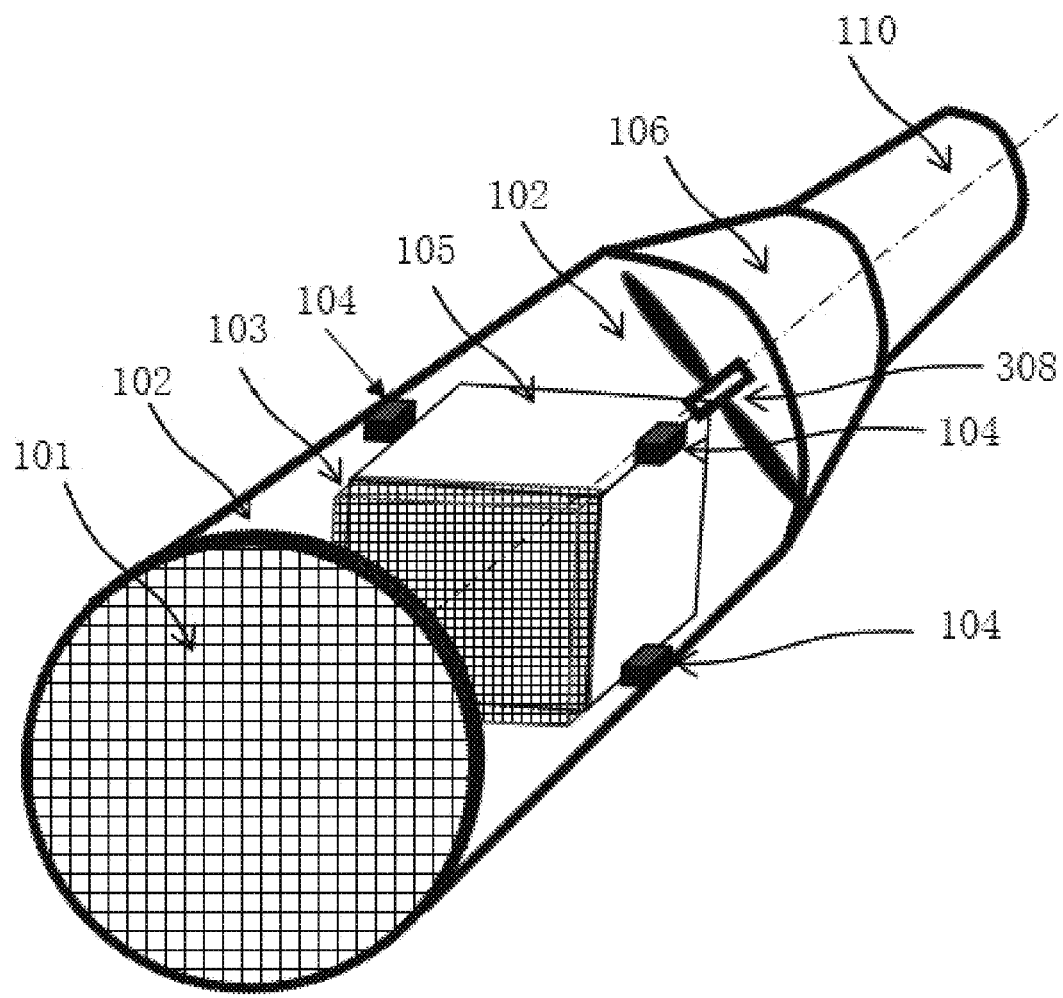
FIG. 3 is a structural schematic diagram of a hydrogen electric hybrid power plant in the embodiment.

As shown in FIG. 1 to FIG. 3, a first embodiment of the present disclosure provides a hydrogen electric hybrid power plant for a hovercar. The hydrogen electric hybrid power plant includes a first-stage duct 102, a transition duct 106 and a second-stage duct 110. An air outlet end of the first-stage duct 102 is connected to the second-stage duct 110 through the transition duct 106. A hydrogen reactor 105 is arranged in the first-stage duct 102, and the hydrogen reactor 105 is fixed with the first-stage duct 102 through a plurality of supporting pieces A 104. A primary filter screen 101 is arranged at a front end of the first-stage duct 102 and fixed on the first-stage duct 102 through a hoop, so that low-altitude sundries and dust are prevented from entering the reactor. A filter 103 is also installed in the first-stage duct 102 and in front of the hydrogen reactor 105. The filter has the functions of physical filtration and chemical filtration at the same time, and is used for filtering dust, particulate matters and chemical harmful gases in low air. The hydrogen reactor 105 is provided with an anode hydrogen inlet pressure regulator 111, and the anode hydrogen inlet pressure regulator 111 is electrically connected with an external hydrogen pressure regulating system. Because the hydrogen reactor can produce water vapor during working, some liquid water can be gathered at the outlet end of the first-stage duct. One end of a return pipe 112 is arranged at an outlet end of the first-stage duct 102, and the other end of the return pipe 112 is connected into a rear end of the filter 103 and an inlet of the hydrogen reactor 105. Some warm and humid airflow and liquid water are returned to the inlet of the hydrogen reactor through the return pipe. The returned warm and humid air low and liquid water can effectively heat and humidify internal materials of the hydrogen reactor, so that the performance and service life of the hydrogen reactor can be effectively improved, and the service life of the hydrogen reactor can be effectively prolonged. A motor 109 is electrically connected with a turbofan 107, and the turbofan 107 is installed in the transition duct 106 or the second-stage duct 110. A component of the motor 109 is fixed together with an outer wall of the transition duct 106 or the second-stage duct 110 through a supporting piece B 108. The motor 109 is a drive motor 209 or a turbofan motor 308.

A cathode of the hydrogen reactor 105 is connected to one end of an anode wire 201, and the other end of the anode wire 201 is connected to a power input anode of a power plant controller 203. An anode of the hydrogen reactor 105 is connected to one end of a cathode wire 202, and the other end of the cathode wire 202 is connected to a cathode of the power plant controller 203. Three-phase space vector control wires 204 are electrically connected with the power plant controller 203. The anode hydrogen inlet pressure regulator 111 is also electrically connected with a control wire 206 of the power plant controller.

Firstly, the length, width and height of the hydrogen reactor are determined according to an electric power requirement. An inner diameter of the first-stage duct 102 of the hybrid power plant is determined according to the size of the internal hydrogen reactor 105. For a hydrogen reactor with a rated power requirement of 45 kW, a membrane electrode is 1.050 A/cm$^2$ in rated current density, 0.771 V in rated voltage, and 0.040 cm in thickness. An active region of a pole plate is 30.000 cm in length and 20.000 cm in width. The material thickness of the pole plate is cm. A unipolar plate is made of titanium alloy with a density of 4.600 g/cm. Therefore, the area of the active region of the pole plate is 600.00 cm$^2$, the total length of the unipolar plate is 33.00 cm, the total width of the unipolar plate is 23.00 cm, the outline area of the pole plate is 759.00 cm$^2$, the forming thickness of the pole plate is 0.196 cm, and the utilization rate of an effective area of the pole plate is 79.051%. Therefore, the hydrogen reactor has the size parameters such as a length of 33 cm, a width of 23 cm, a height of 23 cm, a volume of 17.457 L and a weight of about 4.083 kg.

Secondly, according to fuel and heat dissipation requirements of the hydrogen reactor 105, the ducted airflow velocity is calculated. The electric power of a rated operating point is about 47.34 kW, the efficiency of the rated operating point is 55.071%, the total water production rate of the rated operating point is 5.53 g/s, about 14.40 kW of heat is carried away by water, the air reaction demand of the rated operating point is 23.39 g/s, and the air heat dissipation demand of the rated operating point is 301.23 g/s. The air heat dissipation flow velocity at the rated operating point is 3.88 m/s, which is the average velocity of airflow in the first-stage duct 102.

Thirdly, the hydrogen reactor 105 needs to be fixed together with the inner wall of the first-stage duct 102 by using supporting pieces A 104. Because the hydrogen reactor is cuboid as a whole and a connector at an air inlet is square, the hydrogen reactor is fixed to the inner wall of the first-stage duct 102 by cooperating four edge lines in the longitudinal direction of the reactor with the supporting pieces A 104. The first-stage duct is 50 cm in inner diameter and 60 cm in length. Through computer fluid simulation analysis, the details of internal flow field flow velocity and final optimized dimensions can be further obtained.

Fourthly, the primary filter screen 101 is arranged at a front end of the first-stage duct 102, so that low-altitude sundries and dust are prevented from entering the reactor. The primary filter screen 101 is a steel wire protective net with a diameter of 0.5 mm, and the filter 103 is folded from a filter paper core commonly used in automobiles. The primary filter screen 101 is fixed on the first-stage duct 102 through the hoop.

Fifthly, the return pipe 112 is a steel pipe with a diameter of 2.5 cm and is wound from the outside to an air inlet of the hydrogen reactor 105. The sealing of the return pipe must be strictly considered, because the temperature variation range of the whole power plant may be from −30° C. to 150° C., and the large operating variation range may easily lead to leakage of the sealed hydrogen reactor 105.

Sixthly, the transition duct 106 has a length of 30 cm, and a streamline design is adopted at the boundary to reduce gas turbulence and turbulence. The design of the transition duct needs fluid simulation analysis, and the details of internal flow field flow velocity and final optimized dimensions can be further obtained.

Seventhly, the second-stage duct 110 has an inner diameter of 30 cm, and the turbofan motor 308 is a three-phase alternating-current permanent magnet synchronous motor with a rated maximum rotational speed of 16,000 rpm and a rated power of 5 kw. And then, the actual effective output electric energy of the hydrogen-electric hybrid power plant is 40 kW.

Eighthly, according to the model selection of the motor, the corresponding model of the motor controller (produced by Huichuan Technology, Sunshine Power Supply, INVT and other Chinese motor controller manufacturers). Currently, the general motor controller is generally provided with a redundant pulse modulation interface, so the general motor controller can be directly used as the hybrid power plant controller in the embodiment. The most general proportional-integral-differential (PID) controller and space vector pulse width modulation (SVPWM) algorithm are selected as control algorithms followed by thrust.

Embodiment II

Figure 4:
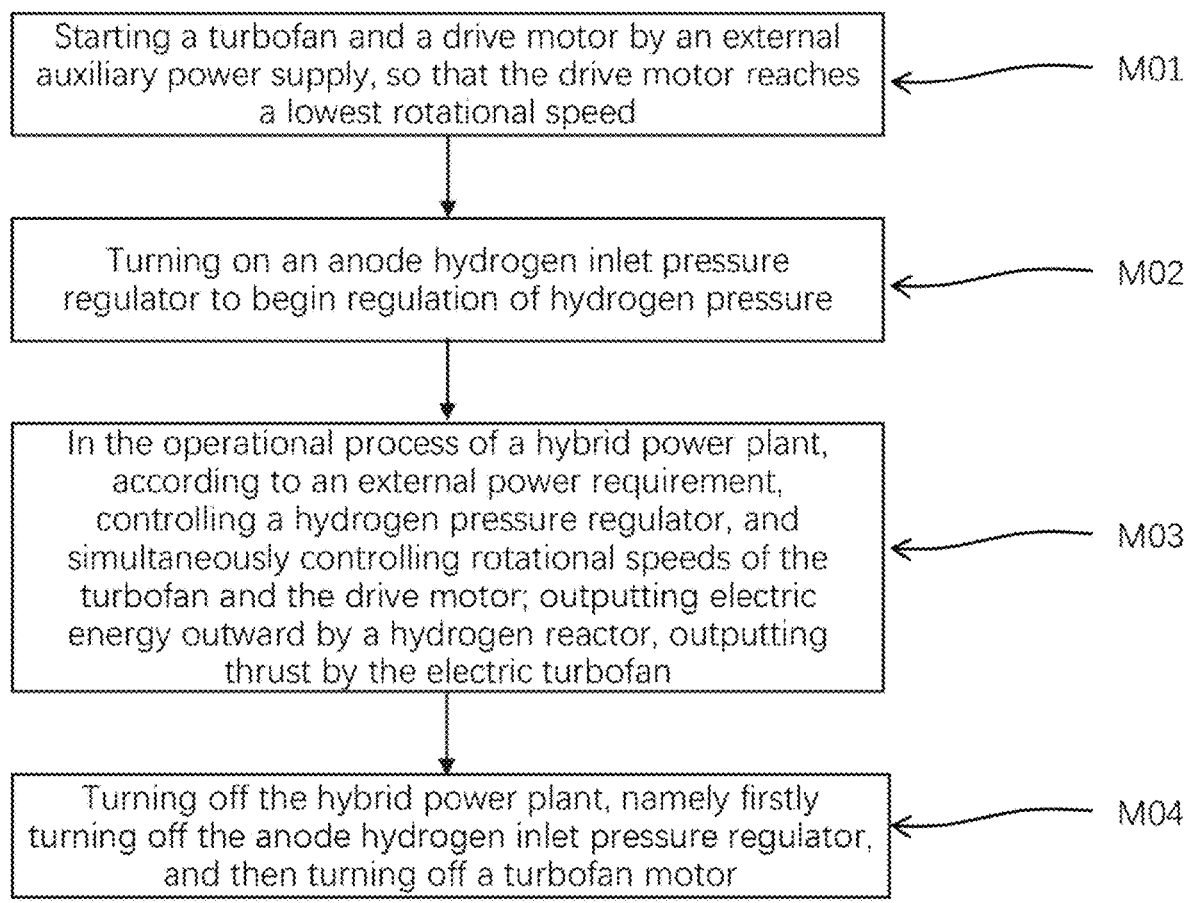
FIG. 4 is a flow diagram of a control method of the hydrogen electric hybrid power plant.
Figure 5:
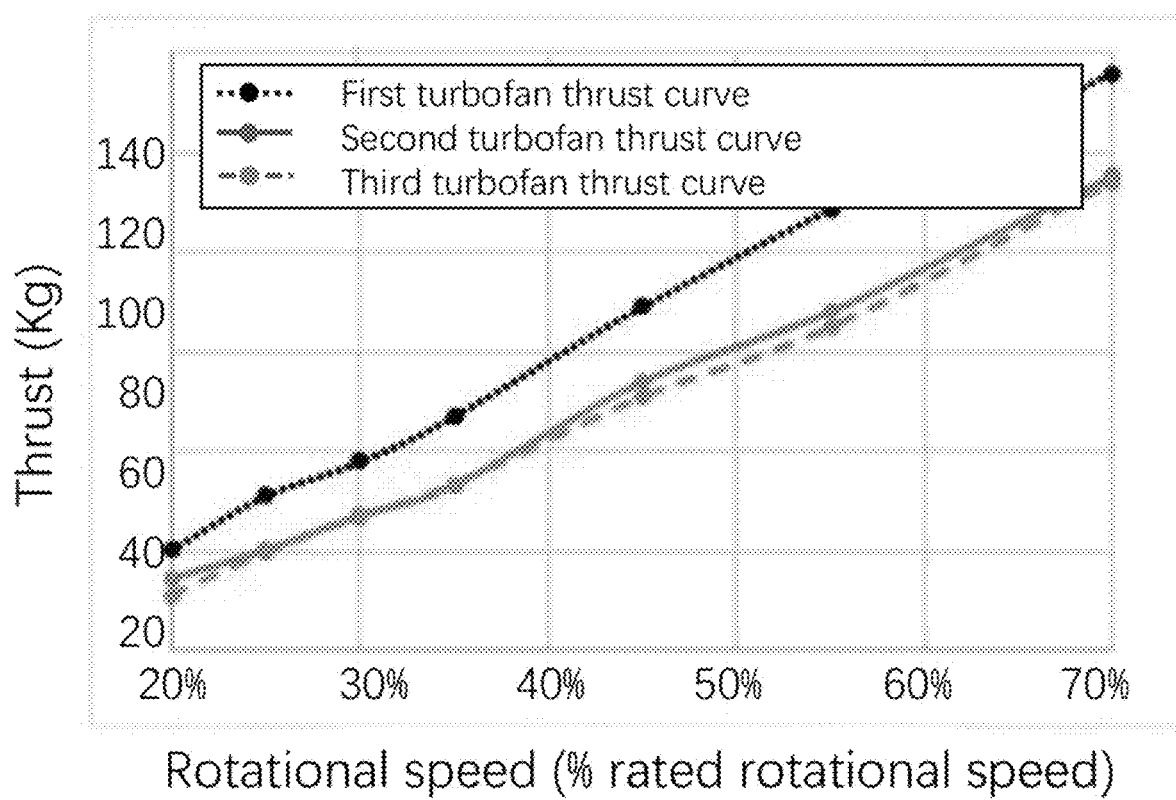
FIG. 5 is a curve diagram of a rotational speed of a drive motor of a turbofan in three different designs and a thrust of the turbofan obtained by using the hydrogen electric hybrid power plant in the embodiment of the present disclosure.

Based on the first embodiment, a second embodiment of the present disclosure provides a control method of a hydrogen electric hybrid power plant for a hovercar as shown in FIG. 4 in the first embodiment, including the following steps:

step one, giving certain auxiliary starting current by an external power supply, starting the turbofan 107, and further starting the drive motor 209, wherein the drive motor 209 reaches a lowest rotational speed to enter a standby state;

step two, in the operational process of the hybrid power plant, determining the output voltage of the hydrogen reactor by the inlet pressure of anode hydrogen, thus determining the output electric power of the hydrogen reactor, turning on the anode hydrogen inlet pressure regulator 111, according to external power, controlling the anode hydrogen inlet pressure regulator 111 through the control wire 206 of the power plant controller according to a proportional relationship set between hydrogen pressure and rotational speed of the motor 109 by the power plant controller 203, and adjusting anode hydrogen inlet pressure of the hydrogen reactor 105 in real time; because the output voltage of the hydrogen reactor is related to the pressure of hydrogen, the output of electric power is related to the pressure of hydrogen; in this state, the hybrid power plant can produce electric power and gas propulsive gas at any time; a set ratio between the hydrogen pressure and the rotational speed of the motor 109 is (10:9) to (10:8);

step three, controlling the rotational speed of the motor 109, outputting electric energy outward by the hydrogen reactor 105, and outputting the thrust by the turbofan 107; the motor 109 is a drive motor 209 or a turbofan motor 308; the rotational speed of the motor 109 is calculated by the power plant controller 203 according to the thrust to be output by the turbofan 107; the three-phase space vector control wires 204 control the rotational speed of the motor 109 according to the calculated thrust to be output by the turbofan 107; when the power plant controller 203 calculates the rotational speed of the motor 109 according to the thrust to be output by the turbofan 107, a set of data corresponding to the rotational speed and the thrust is firstly calibrated through an experiment, then a curve diagram of the rotational speed of the drive motor of the turbofan and the thrust of the turbofan is obtained as shown in FIG. 5 by linear fitting in the embodiment of the present disclosure, and inverse search is carried out with a look-up table method; and step four, turning off the hybrid power plant, namely firstly turning off the anode hydrogen inlet pressure regulator 111, and then turning off the motor 109 to reach a completely rest state.

What is claimed is:
1. A hydrogen electric hybrid power plant for a hovercar, comprising a first-stage duct, a transition duct and a second-stage duct, wherein an air outlet end of the first-stage duct is connected to the second-stage duct through the transition duct;

a hydrogen reactor is arranged in the first-stage duct, and the hydrogen reactor is fixed with the first-stage duct through a plurality of supporting pieces A; a primary filter screen is arranged at a front end of the first-stage duct and fixed on the first-stage duct through a hoop; a filter is also installed in the first-stage duct and in front of the hydrogen reactor; the hydrogen reactor is provided with an anode hydrogen inlet pressure regulator, and the anode hydrogen inlet pressure regulator is electrically connected with an external hydrogen pressure regulating system;

one end of a return pipe is arranged at the outlet end of the first-stage duct, and a second end of the return pipe is connected into a rear end of the filter and an inlet of the hydrogen reactor; and a motor is electrically connected with a turbofan, and the turbofan is installed in the transition duct or the second-stage duct.

2. The hydrogen electric hybrid power plant for a hovercar according to claim 1, wherein a component of the motor is fixed together with an outer wall of the transition duct or an outer wall of the second-stage duct through a supporting piece B; and the motor is optionally a drive motor.

3. The hydrogen electric hybrid power plant for a hovercar according to claim 1, wherein the hydrogen reactor comprises a metal bipolar plate and a proton exchange membrane electrode, and the metal bipolar plate and the proton exchange membrane electrode are combined into the hydrogen reactor in a laminated manner; and the size of the hydrogen reactor is determined by external power.

4. The hydrogen electric hybrid power plant for a hovercar according to claim 3, wherein a cathode of the hydrogen reactor is connected to one end of an anode wire, and a second end of the anode wire is connected to a power input anode of a power plant controller; an anode of the hydrogen reactor is connected to one end of a cathode wire, and a second end of the cathode wire is connected to a cathode of the power plant controller; three space vector control wires are electrically connected with the power plant controller; the anode hydrogen inlet pressure regulator is also electrically connected with a control wire of the power plant controller.

5. The hydrogen electric hybrid power plant for a hovercar according to claim 1, wherein the hydrogen reactor is cuboid; and an inner diameter of the first-stage duct is larger than an outer profile of the hydrogen reactor.

6. The hydrogen electric hybrid power plant for a hovercar according to claim 1, wherein the transition duct adjusts an airflow velocity ratio in the first-stage duct and the second-stage duct, the transition duct adjusts a reactor feed pressure of the hydrogen reactor, the transition duct adjusts a rotational speed of the motor, and the transition duct shapes an outlet airflow of the first-stage duct.

7. A control method of the hydrogen electric hybrid power plant for a hovercar according to claim 1, comprising:
a first step of giving auxiliary starting current by an external power supply, starting the turbofan, and further starting the motor, wherein the motor reaches a lowest rotational speed to enter a standby state;
a second step of turning on the anode hydrogen inlet pressure regulator, controlling the anode hydrogen inlet pressure regulator through a control wire of a power plant controller according to a proportional relationship set between hydrogen pressure and the rotational speed of the motor by the power plant controller, and adjusting anode hydrogen inlet pressure of the hydrogen reactor in real time;
a third step of controlling the rotational speed of the motor, outputting electric energy outward by the hydrogen reactor, and outputting a thrust by the turbofan; and
a fourth step of turning off the hybrid power plant, by first turning off the anode hydrogen inlet pressure regulator, and then turning off the motor.

8. The control method of the hydrogen electric hybrid power plant for a hovercar according to claim 7, wherein a component of the motor is fixed together with an outer wall of the transition duct or an outer wall of the second-stage duct through a supporting piece B; and the motor is optionally a drive motor.

9. The control method of the hydrogen electric hybrid power plant for a hovercar according to claim 8, wherein in the third step; the rotational speed of the motor is calculated by the power plant controller according to the thrust to be output by the turbofan; three space vector control wires control the rotational speed of the motor according to a calculated thrust to be output by the turbofan.

10. The control method of the hydrogen electric hybrid power plant for a hovercar according to claim 7, wherein the hydrogen reactor comprises a metal bipolar plate and a proton exchange membrane electrode, and the metal bipolar plate and the proton exchange membrane electrode are combined into the hydrogen reactor in a laminated manner; and the size of the hydrogen reactor is determined by external power.

11. The control method of the hydrogen electric hybrid power plant for a hovercar according to claim 10, wherein a cathode of the hydrogen reactor is connected to one end of an anode wire, and a second end of the anode wire is connected to a power input anode of the power plant controller; an anode of the hydrogen reactor is connected to one end of a cathode wire, and a second end of the cathode wire is connected to a cathode of the power plant controller; three space vector control wires are electrically connected with the power plant controller; the anode hydrogen inlet pressure regulator is also electrically connected with a control wire of the power plant controller.

12. The control method of the hydrogen electric hybrid power plant for a hovercar according to claim 11, wherein in the third step, the motor is a drive motor; the rotational speed of the motor is calculated by the power plant controller according to the thrust to be output by the turbofan; three space vector control wires control the rotational speed of the motor according to a calculated thrust to be output by the turbofan.

13. The control method of the hydrogen electric hybrid power plant for a hovercar according to claim 10, wherein in the third step, the motor is a drive motor; the rotational speed of the motor is calculated by the power plant controller according to the thrust to be output by the turbofan; three space vector control wires control the rotational speed of the motor according to a calculated thrust to be output by the turbofan.

14. The control method of the hydrogen electric hybrid power plant for a hovercar according to claim 7, wherein the hydrogen reactor is cuboid;
and an inner diameter of the first-stage duct is larger than an outer profile of the hydrogen reactor.

15. The control method of the hydrogen electric hybrid power plant for a hovercar according to claim 14, wherein in the third step, the motor is a drive motor; the rotational speed of the motor is calculated by the power plant controller according to the thrust to be output by the turbofan; three space vector control wires control the rotational speed of the motor according to a calculated thrust to be output by the turbofan.

16. The control method of the hydrogen electric hybrid power plant for a hovercar according to claim 7, wherein the transition duct adjusts an airflow velocity ratio in the first-stage duct and the second-stage duct, the transition duct adjusts a reactor feed pressure of the hydrogen reactor, the transition duct adjusts the rotational speed of the motor, and the transition duct shapes an outlet airflow of the first-stage duct.

17. The control method of the hydrogen electric hybrid power plant for a hovercar according to claim 16, wherein in the third step, the motor is a drive motor; the rotational speed of the motor is calculated by the power plant controller according to the thrust to be output by the turbofan; three space vector control wires control the rotational speed of the motor according to a calculated thrust to be output by the turbofan.

18. The control method of the hydrogen electric hybrid power plant for a hovercar according to claim 7, wherein in the third step, the motor is optionally a drive motor; the rotational speed of the motor is calculated by the power plant controller according to the thrust to be output by the turbofan; three space vector control wires control the rotational speed of the motor according to a calculated thrust to be output by the turbofan.

19. The control method of the hydrogen electric hybrid power plant for a hovercar according to claim 18, wherein when the power plant controller calculates the rotational speed of the motor according to the thrust to be output by the turbofan and a set of data corresponding to the rotational speed, and the thrust is firstly calibrated through an experiment, and then inverse search is carried out by linear fitting with a look-up table method.

20. The control method of the hydrogen electric hybrid power plant for a hovercar according to claim 7, wherein in the second step, a positive correlation is formed between the hydrogen pressure and the rotational speed of the motor, and a set ratio is in a variation range of (10:9) to (10:2).

* * * * *